Patented Mar. 13, 1923.

1,448,110

UNITED STATES PATENT OFFICE.

HAROLD DE OLANETA, OF NEW HAVEN, CONNECTICUT, ASSIGNOR TO WINCHESTER REPEATING ARMS COMPANY, OF NEW HAVEN, CONNECTICUT, A CORPORATION OF CONNECTICUT.

PURIFICATION OF MANGANIFEROUS MATERIAL.

No Drawing. Application filed May 24, 1919. Serial No. 299,522.

*To all whom it may concern:*

Be it known that I, HAROLD DE OLANETA, a citizen of the United States, residing in New Haven, New Haven County, Connecticut, have invented certain new and useful Improvements in the Purification of Manganiferous Material, of which the following is a full, clear, and exact description.

In primary cells, and more particularly small dry cells, such as those which furnish current for flash lights, etc., manganese dioxid is commonly used as a depolarizer, and a solution containing among other things ammonium chlorid or commercial sal ammoniac with or without zinc chlorid is employed as an exciting agent.

The manganese dioxid heretofore used in dry cells contains in almost all cases a number of impurities which have a deleterious action on the cell and shorten its life. I ascribe this deleterious action to the fact that the impurities are acted upon by or soluble in the electrolyte, with the result that as soon as the ordinary cell is made, a local action is set up which short circuits the cell and drains the same while on the shelf. Of course, the rate of deterioration depends on the character of the impurities present. If, for example, iron is present in a substantial quantity, the cell will be drained in a very short time, because the iron is converted into an oxid of iron which eventually finds its way to the zinc, and once in contact with the zinc, a short circuit is created. If, for a further example, potash of any description, either free or neutralized, is present in the manganese dioxid, the sal ammoniac will dissolve the same and form a salt with the zinc or with any zinc salt present, setting up a deleterious local action. These deleterious substances in the manganese often include iron, copper and phosphorus when manganese ore or pyrolusite is used. When hydrated manganese dioxid is employed, the impurities will often be found as sulphur, acids, nitrates, or. chlorids, depending on the acids, nitrates, or chlorids, depending on the process of hydration. Where a precipitate of manganese is employed, lime, potash or the like will be present, depending upon the chemicals used for precipitation.

The above-enumerated impurities, and others, when chemically combined with the manganese, are insoluble in water, and when it is attempted to separate them out by the use of acids, for example, the result will either be that the manganese is dissolved, on the one hand, or, on the other hand, that insoluble compounds are created.

One of the primary objects of the present invention is to provide a simple and commercially practical process of purifying manganese dioxid or other manganiferous material.

More specifically, the object of my present improvements is the removal in a simple and convenient manner of those impurities in the manganese dioxid which have a deleterious action on the battery as a result of the action on or dissolution of the impurities by the electrolyte, while the cell is on the shelf.

Another object of the invention is to furnish a method of removing impurities from various manganese compounds whereby a manganese material susceptible of a high degree of oxidation, and useful as a depolarizer and for other purposes, may be produced.

By my invention I also make it possible to utilize for battery manufacture and other industrial applications certain kinds of manganese compound which heretofore were considered waste products.

To these and other ends, the invention consists in the novel features to be hereinafter described and claimed.

In carrying out my process, I prefer to make use of a suitable tank of any appropriate size, shape and material, provided with a perforated or screenlike bottom. On the bottom of the tank is placed a suitable piece of filtering material, such as cloth. The manganese compound which is to be employed, after having been ground or comminuted, and sifted, is charged into the tank, leaving a certain amount of space at the top. A solution of a neutral salt, usually an ammonium salt, for example, a solution of ammonium chlorid, of any appropriate density, say one degree Baumé, is then poured into the top of the tank onto the material and permitted to percolate through it. If it be assumed that the manganese material takes up, say, two thirds of the tank capacity, the remaining one-third of the tank will be filled with the saline solution, which will pass completely into the material under treatment in, say, twenty-four hours. Another similar quantity of the solution will then be poured into the tank and allowed to pass down into the material in the same manner. After the lapse of forty-eight hours, for example, a third quantity of solution will be poured into the tank, and similar quantities of solution will be poured in at approximately equal intervals, as needed. When the solution commences to pass out of the tank at the bottom, the same is tested in any suitable manner which permits comparison with the solution being poured in at the top. I test the outgoing solution with a hydrometer when the material being treated is a hydrate or a precipitate. When this grade of manganese material is treated, the increase in density will show strong contamination for the first passage of the liquid, but gradually the impurities in the solution will thin out and a decrease of density is noted, until the solution coming out of the bottom of the tank has the same density as that poured in at the top. No further tests are then needed. When the material being treated is pyrolusite, or natural manganese dioxid, for example, the solution passing out at the bottom, if it shows no difference in Baumé, is tested chemically, which will indicate the character and amount of impurities, such as metallic oxids, which are being leached out. In any case, if the best results are to be obtained, the solution is passed through the material until that flowing out at the bottom of the tank corresponds to that poured in at the top.

In this process, which will consume a variable length of time, depending on the kind of material treated, and the facilities available, the impurities in the material, and especially those which render oxidation difficult, are separated out and removed in the outgoing solution. The manganese material, however, is not affected by the ammonium chlorid and remains in its original bulk.

The material remaining in the tank, which is practically pure manganese oxids, is then taken out and dried and if intended for use as a depolarizing material, is permitted to take up oxygen from the air. The amount of oxygen absorbed will, of course, depend to a certain extent on the amount of the lower oxids of manganese contained in the initial material. When the impurities have been removed, the material will tend to absorb oxygen up to its full oxygen-absorbing capacity. It is preferable to expose the purified material to the air for several days at least, so that a maximum amount of oxygen will be taken up thereby before it is used in the battery as a depolarizer.

In my process above described, the specific density of the solution poured into the tank at various times should always be the same. That is, if I start out with a solution of one degree Baumé, subsequent quantities of the solution used are likewise one degree Baumé. It is not necessary to remove all of the sal ammoniac from the material before drying and oxidizing, if the material is to be employed as a depolarizer in a small dry cell. While it is possible to remove the sal ammoniac by washing with water, the material, as I employ it for battery purposes, carries a trace of uncombined sal ammoniac when placed in the cell.

Various changes and modifications may be made in the detailed procedure, and in other matters, without departing from the scope of the invention as defined in the claims. For example, the process of treating the manganese material with an ammonium salt or salts may be considerably varied without departing from the broad principles of the invention; and if leaching of the material with a neutral saline solution is practised, the method and means adopted for obtaining the leaching or lixiviating effect can be different from those herein particularly described.

The foregoing detailed description of one example indicating how the process may be carried into effect is given in explanation rather than in limitation, and other substances than those specifically named herein which are equivalents thereof may be employed without digressing from the broader aspects of the invention. While I prefer to use an ammonium chlorid solution as a leaching agent so as to adapt the manganese material for most efficient employment in a dry cell, the ammonium salt hereinbefore mentioned may in some cases be a salt other than the chlorid. In such case, the action of the ammonium ions upon the manganese compound will, as before, be beneficial, although the chlorid is preferred on account of the relative simplicity of the reactions involving the chlorin radical and their efficacy in facilitating the dissolving out of the objectionable impurities.

I do not claim herein the method of manufacturing a primary cell in the manner disclosed, or the cell per se, or the depolarizer as such, or other features herein disclosed, which are claimed in my divisional application Serial No. 340,752, and other copending applications filed by me.

By the terms "neutral solvent," "neutral solution" and similar terms as used herein, I intend to designate materials which are neutral in the ordinary sense of the term, i. e., which do not affect litmus, methyl orange, congo red, and other common indicators.

What I claim is:

1. A process for the purification of manganiferous material, which comprises the treatment of the material with ammonium chlorid.

2. A process for the purification of manganese dioxid, which comprises the treatment of the material with a solution of ammonium chlorid.

3. A process for the purification of manganiferous material which comprises pouring over a mass of the same and allowing to percolate therethrough, a solution of ammonium chlorid.

4. A process for the purification of manganiferous material which comprises leaching all parts of a mass of the same with a solution of ammonium chlorid.

In witness whereof, I have hereunto set my hand on the 23rd day of May, 1919.

HAROLD DE OLAÑETA.